United States Patent
Gallone et al.

(10) Patent No.: US 10,668,935 B2
(45) Date of Patent: Jun. 2, 2020

(54) RAIL VEHICLE, PARTICULARLY A TRAM COMPRISING A BUMPER

(71) Applicant: HITACHI RAIL ITALY S.p.A., Naples (IT)

(72) Inventors: Antonello Gallone, Salerno (IT); Antonio Tarantino, S. Anastasia (IT)

(73) Assignee: HITACHI RAIL ITALY S.P.A., Naples (IT)

( * ) Notice: Subject to any disclaimer, the term of this patent is extended or adjusted under 35 U.S.C. 154(b) by 170 days.

(21) Appl. No.: 15/528,682

(22) PCT Filed: Nov. 27, 2015

(86) PCT No.: PCT/IB2015/059179
§ 371 (c)(1),
(2) Date: May 22, 2017

(87) PCT Pub. No.: WO2016/084044
PCT Pub. Date: Jun. 2, 2016

(65) Prior Publication Data
US 2017/0274914 A1    Sep. 28, 2017

(30) Foreign Application Priority Data

Nov. 28, 2014  (IT) .............. TO2014A0985

(51) Int. Cl.
*B61F 19/04*     (2006.01)
*B61D 17/00*     (2006.01)
*B61D 17/06*     (2006.01)
*B61D 17/02*     (2006.01)

(52) U.S. Cl.
CPC ............ *B61F 19/04* (2013.01); *B61D 17/005* (2013.01); *B61D 17/02* (2013.01); *B61D 17/06* (2013.01); *Y02T 30/32* (2013.01)

(58) Field of Classification Search
CPC ....... B61F 19/04; B61D 17/005; B61D 17/02; B61D 17/06
See application file for complete search history.

(56) References Cited

U.S. PATENT DOCUMENTS

| 2004/0169362 | A1* | 9/2004 | Hammer | B60R 19/205 280/751 |
| 2005/0087998 | A1* | 4/2005 | Curry | B60R 19/205 293/107 |
| 2014/0290528 | A1* | 10/2014 | Fan | B61F 19/04 105/392.5 |

(Continued)

FOREIGN PATENT DOCUMENTS

| JP | 2001 208120 |   | 8/2001 |
| JP | 2001208120 | A * | 8/2001 |

(Continued)

*Primary Examiner* — Jason C Smith
(74) *Attorney, Agent, or Firm* — Leason Ellis LLP

(57) ABSTRACT

It is described a rail vehicle, in particular a tram comprising a front portion and a bumper. Preferably, the bumper comprises at least a thermoplastic material comprising PPS, more preferably the bumper comprises more than 50%, even more preferably more than 80% by weight on the total weight of the thermoplastic materials present in the bumper in a thermoplastic PPS-based material. Preferably, the thermoplastic material comprises reinforcement fibres, more preferably glass fibres.

9 Claims, 1 Drawing Sheet

(56) References Cited

U.S. PATENT DOCUMENTS

2017/0274914 A1\* 9/2017 Gallone ................ B61D 17/06

FOREIGN PATENT DOCUMENTS

| JP | 2012-139834 | 7/2012 | | |
|---|---|---|---|---|
| WO | WO 99/00236 | 1/1999 | | |
| WO | WO 2005/028275 | 3/2005 | | |
| WO | WO-2005028275 A1 \* | 3/2005 | ............ | B61D 15/06 |
| WO | WO 2012/038383 | 3/2012 | | |
| WO | WO-2012038383 A1 \* | 3/2012 | ........... | B61D 17/041 |
| WO | WO 2012/137554 | 10/2012 | | |

\* cited by examiner

RAIL VEHICLE, PARTICULARLY A TRAM COMPRISING A BUMPER

CROSS REFERENCE TO RELATED APPLICATIONS

The present application is a U.S. National Phase of International Patent Application PCT/IB2015/059179, filed on Nov. 27, 2015, which claims priority to Italian Application No. TO2014A000985, filed on Nov. 28, 2014, each of which is incorporated by reference as if expressly set forth in their respective entireties herein.

TECHNICAL FIELD

The invention relates to a rail vehicle, particularly a tram, comprising a bumper.

STATE OF THE ART

It is known that rail vehicles, and particularly trams, are generally manufactured in relatively few specimens, and therefore the various portions of the trams are often not subject to safety regulations similar to those which are used for motor vehicles and, in particular, for cars. Generally, car bumpers must obey precise regulations in order to be able not only to absorb the bumps, thus decreasing any damage to the motor vehicle passengers, but also to decrease the impact of an accident on pedestrians. Therefore, bumpers for motor vehicles are made of high-performance materials, and have portions shaped to absorb energy.

The effectiveness of the vehicle bumper is also verified by means of appropriate tests.

In the case of rail vehicles, on the other hand, the bumper portion is actually only a portion of generally metal material, similar to the rest of the bodywork, and is not generally shaped to absorb energy, decrease the damage on the vehicle passengers or protect any possibly hit pedestrians.

However, rail vehicles circulating on urban roads, and in particular trams, are subject to accidents just like any other motor vehicle, and are even more dangerous for pedestrians and other road users because of their greater mass.

In particular, the shape of the front portions of rail vehicles, and in particular of trams, and the materials nowadays constituting the front portions of rail vehicles, and in particular trams, are generally not suitable to absorb energy and to decrease any damage to pedestrians.

A bumper made according to the prior art is shown by way of example in FIG. 1 and is indicated as a whole by the reference number 1. The front portion 2 of a tram 3 has an aerodynamic shape that does not allow limiting the damage to a pedestrian in case of accident. In fact, the front portion 2 of the tram 3 has a projecting end 4, namely the most projecting end from the front profile of the tram, at such a height that it could quite likely break the bones of a pedestrian involved in an accident.

Finally, since generally no tests are carried out to verify the absorption of energy or the safety provided by the present bumpers for rail vehicles, and in particular for trams, is not possible to verify the effectiveness of any change, geometric as well as of material, on the bumper portion.

For this reason it has been sought a solution for manufacturing a bumper for a rail vehicle which solves the aforesaid problems and which, in particular, allows reducing the risk of damage to pedestrians in case of accidents.

OBJECT OF THE INVENTION

The object of the present invention is to provide a rail vehicle, particularly a tram, comprising a bumper for trams which can solve the above problems and which is easily producible and marketable.

According to the present invention, the above problems are solved by a bumper for a vehicle rail according to claim 1.

DETAILED DESCRIPTION OF THE INVENTION

Figure 1:
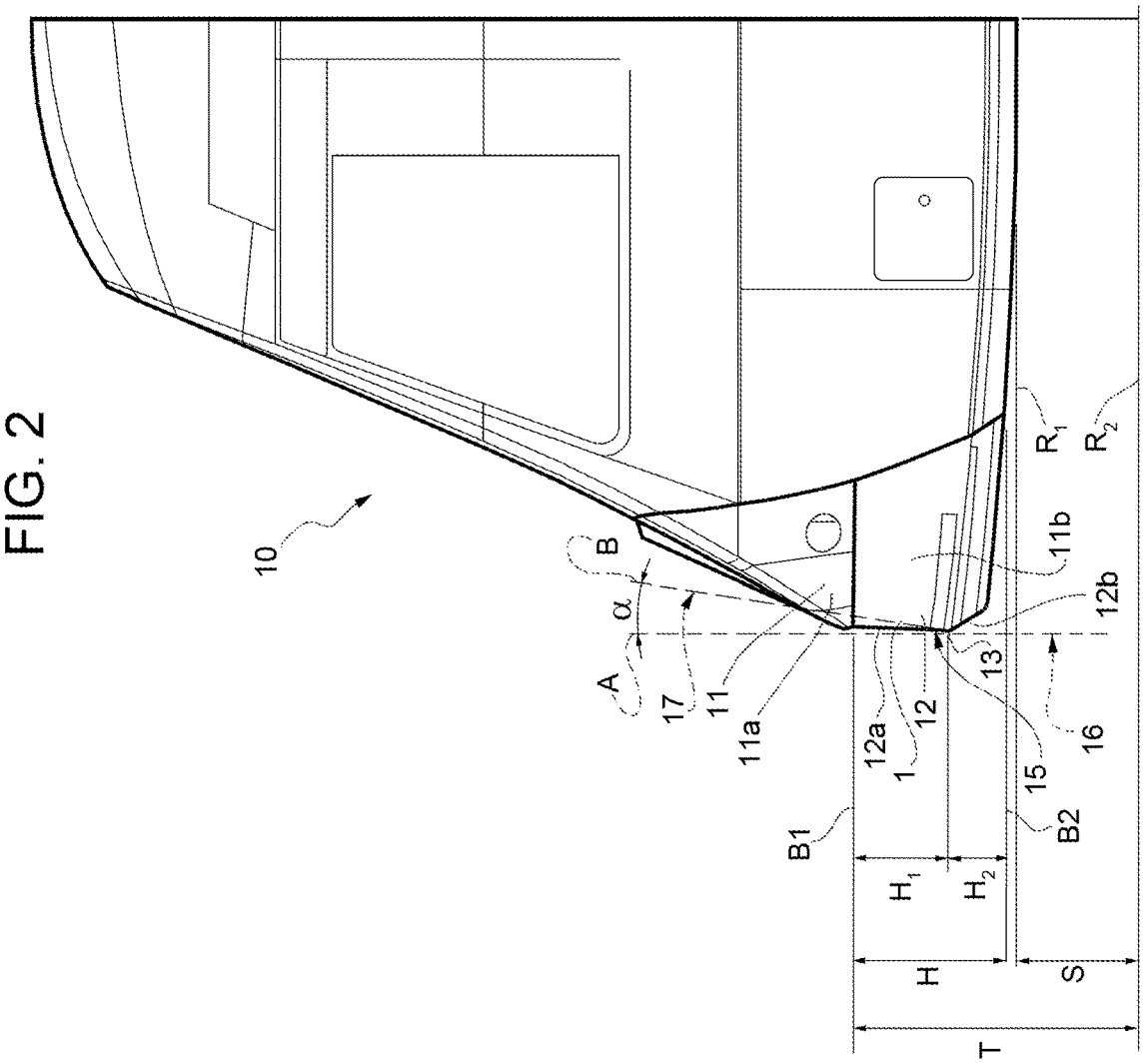
FIG. 1 is a side view of a front portion of a known tram.
Figure 2:
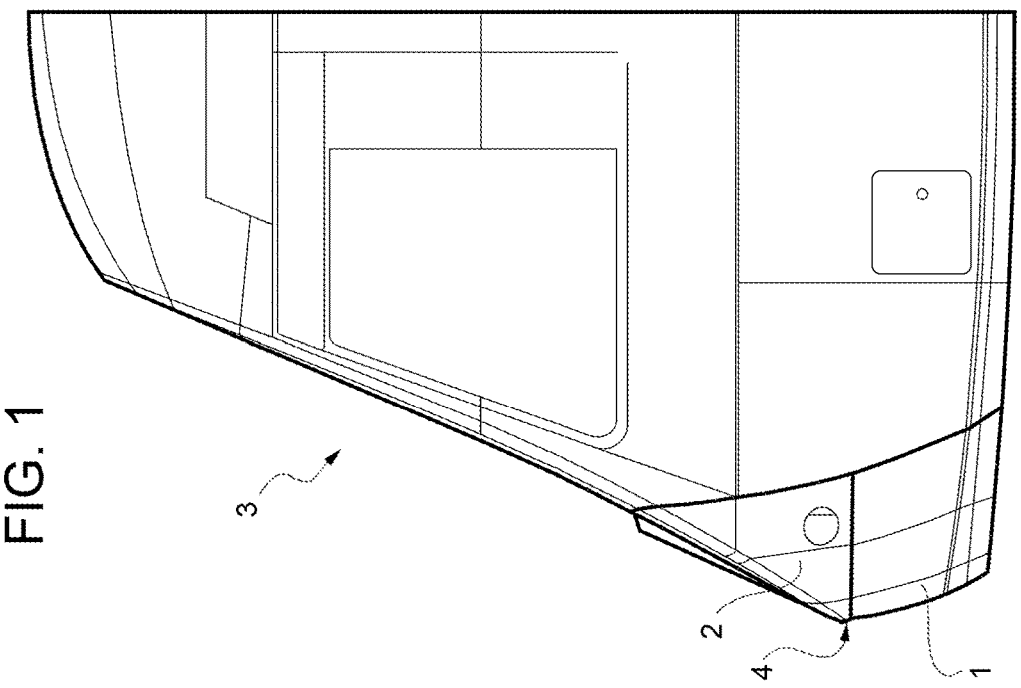
FIG. 2 is a side view of a front portion of a tram comprising a bumper according to the present invention.

The following description will particularly refer to the non-limiting embodiment of the invention shown in FIG. 2. With reference to FIG. 2, 10 indicates in its entirety a tram comprising a front portion 11 comprising in turn a bumper 12.

The tram front portion 11 preferably comprises at least an upper portion 11a and a lower portion 11b.

The bumper 12 preferably constitutes the lower portion 11b of the front portion 11.

A vertical axis A and a corresponding plane 16 pass through a projecting end 13 comprised in a bumper 12. The vertical plane 16 is perpendicular to the ground surface on which the tram moves, namely it is perpendicular to the iron plane, that is the head of the rail indicated by $R_2$, and perpendicular to the horizontal plane passing through the projecting end 13. The projecting end 13 constitutes the most projecting horizontal line of the tram. It is also possible that the front portion of the tram may cover more portions, besides the upper and lower ones, and each of them may include the projecting end.

Preferably, the bumper 12 extends for a height H comprised between the plane of the upper horizontal end plane B1 parallel to the horizontal plane passing through the top of the head of the ground rail and passing through the highest point of the bumper 12 and the lower horizontal end plane B2 passing through the lowest point of the bumper 12, always parallel to the horizontal plane passing through the top of a plane of the rail R.

In detail and with reference to the plane of the rail R, which in the case of a tram is equivalent to the plane of the road, in the embodiment shown, the lower part of the tram in the tare condition, namely without passengers, is preferably located at a height from the ground S greater than 150 mm, for example approximately 200 mm from the iron plane or from the top of the head of the rail.

Any measure of the height from the ground has been taken when the tram is empty.

When there are passengers on the tram, the lower part can be lowered up to have a height from the ground S of 166 mm because of the weight of the passengers in the vehicle.

Preferably, the bumper 12 includes an upper region 12a which extends for a height H1 and starts from the line of the projecting end 13, and a lower region 12b that extends for a height H2.

The height H1 of the upper region 12a of the bumper 12 preferably corresponds to 1.5-1.8 times the height H2 of the lower region 12b.

This range can produce optimal results in collisions with pedestrians. The lower region 12b has a preferably flat but tapered shape.

It must meet the basic requirement of maximum permissible overall dimensions during the travel in relation to the maximum permissible profile of the vehicle.

The height H1 of the upper region 12a of the bumper 12 is preferably equal to at least 30% of the height H of the bumper, more preferably at least 50%, even more preferably at least 60%.

The upper region 12a includes a front surface 15 which is located between a vertical plane 16 passing through the axis A and an inclined plane 17 passing through the axis B, which is tilted with respect to the axis A at an angle α as shown in FIG. 2. The angle α between said vertical plane 16 and the inclined plane 17 is preferably less than 5°. More preferably, the upper region 12a has a front surface 15 substantially aligned to the plane 16 passing through the projecting end 13.

Alternatively, the front surface 15 is substantially flat and inclined with respect to the plane 16 toward the tram. More preferably, the angle α is less than 2°.

Alternatively, the front surface 15 is slightly curved, but is nonetheless predominantly, i.e. for more than 50% of its surface, between the planes A and B.

The upper level B1 of the bumper 12 is located slightly below the line of the projecting end 13 at a height T preferably comprised between 600 and 900 mm, e.g. 700 mm, while the lower plane B2 is located at a height which is a little higher than the lowest tram plane at a height preferably comprised between 200 and 300 mm, e.g. 240 mm. The height H1 is preferably comprised between 250 and 350 mm, e.g. 280 mm.

The bumper 12 is preferably made of a single piece. On its inner surface, the bumper 12 is provided with coupling means, not shown, for coupling it to the vehicle. The bumper 12 is conventionally coupled by means of these coupling means to the remaining part of the vehicle.

The bumper 12 is preferably made of polymeric material, more preferably the bumper comprises polyphenylene sulphide, also indicated to hereinafter simply by the acronym PPS.

Even more preferably, the bumper 12 comprises a composition comprising at least 50% by weight, more preferably at least 80%, of the total weight of the thermoplastic materials present in the bumper 12 in a PPS-based thermoplastic material.

In a preferred embodiment, the bumper comprises only PPS as thermoplastic material.

Preferably, besides the PPS the composition comprises further additives, and in particular reinforcing fibres. More preferably, the reinforcing fibres preferably comprise a material selected from the group consisting of glass fibres, carbon fibres, PBO fibres.

Even more preferably, the reinforcing fibres are glass fibres.

More preferably, the reinforcing fibres are added in a percentage by weight comprised between 1 and 50% with respect to the total weight of thermoplastics.

For example, the product Tencate®, in particular Tencate® 7781 PPS Glass, can be used as material for the bumper. Preferably, the lamination sequence is 0/90°.

Preferably, the product obtained has a thickness comprised between 0.1 and 0.6 mm, even more preferably between 0.2 and 0.4 mm, for example it may have a thickness of 3 mm. Thanks to the use of polymeric materials rather than metal ones, it is also possible to have a bumper with a lower weight.

If the thickness of the bumper is about 3 mm, the total weight is around 9 kg against 13 kg of the present metal solution.

The efficiency of the front surface of a Sirio Kayseri type tram has been evaluated by means of tests, in order to reduce injuries to pedestrians and other vulnerable road users in the event of a collision with the front surfaces of the vehicles.

The test procedures follow the safety control procedures for motor vehicles and, in particular, the tests described in the documents EuroNCAP testing Pedestrian Protocol 5.3.1 WG17 and EEVC (European Enhanced Vehicle-Safety Committee Working Group 17).

The main difference from the test protocol used for the tests is that the EuroNCAP test speed was set at 20 km/h.

Two test positions have also been identified, the centre position Y=0 and the side position Y=−577.

The legform impactor for impact tests against the bumper is in "free flight" at the time of collision. The free flight starts at such a distance from the vehicle to ensure that the test results are not influenced by the contact with the propulsion system during the rebound of the impactor. The impactor may be projected by means of an air, spring or hydraulic catapult, or by any other means that demonstrably obtain the same result.

The selected test points are mutually spaced by at least 132 mm and are at least 66 mm inside the corners of the bumper.

The direction of the speed vector is horizontal and parallel to the longitudinal vertical plane of the vehicle. The tolerance for the direction of the speed vector in the horizontal plane and in the longitudinal plane is ±2° at the time of the first contact.

The axis of the impactor is perpendicular to the horizontal plane with a tolerance of ±2° in the side and longitudinal planes. The horizontal, longitudinal and side planes are orthogonal to one another.

The lower end of the impactor is 25 mm above the reference ground level at the time of the first contact with the bumper, with a tolerance of ±10 mm.

At the time of the first contact, the impactor must have the intended orientation about its vertical axis, with a tolerance of ±5°, to allow the proper functioning of the knee joint.

At the time of the first contact, the centre line of the impactor must be at the point of impact, within a tolerance of ±10 mm.

During contact between the impactor and the vehicle, the impactor must not come into contact with the ground or any other object not being part of the vehicle.

A special device that simulates the leg of a user has been used to perform the tests.

In such a device, the femur and the tibia have a diameter of 70±1 mm and both are covered by a foam which simulates muscle tissue and skin. The foam is of the type Confor™ type CF-45, with a thickness of 25 mm. The external covering is made of neoprene with a thickness of 6 mm; the surface is covered with nylon cloth with a thickness of ½ mm.

The term "centre of the knee" indicates the point about which the knee effectively bends.

The term "femur" indicates all components or parts of components (including flesh, skin covering, damper, instruments and brackets, pulleys, etc. attached to the impactor for launching it) above the centre of the knee.

The term "tibia" indicates all components or parts of components (including flesh, skin covering, instruments and brackets, pulleys, etc. attached to the impactor for launching it) below the centre of the knee. Note that the tibia as defined includes the mass etc. . . . of the foot. The total mass of femur and tibia is respectively 8.6±0.1 kg and 4.8±0.1 kg, and the total mass of the impactor is 13.4±0.2 kg. The centre of gravity of femur and tibia is 217±10 mm and 233±10 mm from the centre of the knee. The moment of inertia of femur and tibia about a horizontal axis through the respective centre of gravity perpendicular to the direction of impact is 0.127±0.010 kgm2 and 0.120±0.010 kgm2.

A uniaxial accelerometer is mounted on the non-impacted side of the tibia, 66±5 mm below the centre of the knee joint, with its sensitive axis in the direction of impact. The impactor is provided with instruments to measure the bending angle and the shearing deformation between femur and tibia.

The shearing deformation system requires a damper which can be mounted at any point of the back side of the impactor or inside it. The damper properties must be such to guarantee that the impactor meets the requirements for the shearing deformation, both static and dynamic, and that it prevents excessive vibrations of the shearing deformation system.

A bumper made of Tencate® 7781 PPS Glass with a thickness of 3 mm is under test.

A front part of a tram, rigidly fixed to a metal frame, was provided for carrying out the tests.

The total height of the system was limited to 2750 mm from the ground to allow the installation inside the test chamber.

The lower leg impactor is shot against the surface of the tram by means of a parabolic trajectory and impacts the surface of the vehicle at the vertex of the trajectory when the vertical speed is zero.

The structure has been positioned in front of the propulsion system and rigidly constrained to the ground by means of metal brackets bolted to the ground.

To allow such a trajectory, the vehicle has been elevated from the ground of 83 mm to avoid a contact of the impactor with the ground during the acceleration phase.

The tested vehicle must meet the requirements described in the document EEVC WG17 (European Enhanced Vehicle-Safety Committee Working Group 17).

To test the impact of the leg against the bumper, the test is performed at an impact speed of 20 km/h. The maximum angle of dynamic knee bending is 15.0°, the maximum deformation of dynamic knee breaking is 6.0 mm. The acceleration measured at the upper end of the tibia is not more than 150 g.

The results are reported in Table 1 below.

TABLE 1

| Pos. | Type | Vel. [Km/h] | Tibia Acc. [g] Limit: <150 g | Kee bending angle [°] Limit: <15° | Dynamic knee deformation [mm] Limit: <6 mm |
|---|---|---|---|---|---|
| Y = 0 | BM1 | 19.87 | 69.80 | 2.11 | −0.89/0.12 |
| Y = −577 | BL1 | 20.34 | 58.71 | 1.99 | −1.48/0.34 |
| Y = −577 | BL2 | 19.87 | 49.87 | 1.94 | −2.09/0.10 |
| Y = 0 | BM2 | 19.84 | 65.16 | 2.38 | −1.07/0.25 |

All measured parameters are well within the reference limits expressed in the document EEVC WG17 (European Enhanced Vehicle-Safety Committee Working Group 17), with reference to possible knee injuries or broken tibias in case of collision with a vehicle.

The advantages of the tram bumpers according to the present invention are clear.

In particular, the use of PPS allows obtaining a bumper which passes the tests of risk of knee injury or tibia breakage for a pedestrian in case of impact against the vehicle according to the rules EEVC.

Furthermore, also the use of a bumper profile according to the invention and as described above allows reducing the risk of knee injury or tibia breakage for a pedestrian in case of impact against the vehicle according to the EEVC rules.

In particular, using the automotive regulations, the reference values of tibia acceleration (size g=9.81 m/s$^2$), knee sliding (mm) and knee rotation)(°) are well within the limits set by the automotive regulations.

The invention claimed is:

1. A rail vehicle (10) comprising a bumper (11) comprising PPS and a front portion (11) comprising a projecting end line (13) through which a vertical plane (16) passes that is perpendicular to a rail plane R and a bumper (12) extending for a height H between an upper horizontal end plane B1 passing through the highest point of the bumper (12) and a lower horizontal end plane B2 passing through the lowest point of the bumper, characterized in that said bumper 12 comprises at least an upper area (12a) extending for a height H1 and comprising a front surface (15) comprised between a vertical plane (16) and an inclined plane (17); said vertical plane passing through an axis A passing from said projecting end, and in that said height H1 is equal to at least 30% of said height H of said bumper (12) and in that the angle between said vertical plane (16) and said inclined plane (17) is less than 5°.

2. A rail vehicle (10) according to claim 1, characterized in that said bumper (12) comprises more than 50% in weight of the total weight of the thermoplastic materials present in the bumper (12) in a PPS-based thermoplastic material.

3. A rail vehicle (10) according to claim 1, characterized in that said bumper (12) comprises more than 80% in weight of the total weight of the thermoplastic materials present in the bumper (12) in a PPS-based thermoplastic material.

4. A rail vehicle (10) according to claim 1, characterized in that said bumper (12) comprises PPS as only thermoplastic material.

5. A rail vehicle (10) according to claim 1, characterized in that said bumper (12) comprises reinforcing fibres.

6. A rail vehicle (10) according to claim 5, characterized in that said reinforcing fibres comprise at least a substance selected from the group comprising fibreglass, carbon fibres, PBO fibres.

7. A rail vehicle (10) according to claim 5, characterized in that said reinforcing fibres are fibreglass.

8. A rail vehicle (10) according to claim 5, characterized in that said reinforcing fibres are added in a percentage of weight comprised between 1 and 50% with respect to the total weight of the thermoplastics.

9. A rail vehicle (10) according to claim 5, characterized in that said bumper (12) has an average thickness comprised between 0.1 and 0.6 mm.

* * * * *